United States Patent [19]

Castro et al.

[11] 4,365,404
[45] Dec. 28, 1982

[54] MAKING JACKETED LINED PIPE

[75] Inventors: German O. Castro; Frederick C. Sovia, both of Midland, Mich.

[73] Assignee: The Dow Chemical Company, Midland, Mich.

[21] Appl. No.: 208,208

[22] Filed: Nov. 19, 1980

Related U.S. Application Data

[62] Division of Ser. No. 31,795, Apr. 20, 1979.

[51] Int. Cl.³ ...................... B21D 39/00; B23P 19/04
[52] U.S. Cl. .............................. 29/455 R; 29/157 R; 29/157.3 R; 29/512; 29/523; 228/183; 285/55
[58] Field of Search .................... 29/455 R, 512, 523, 29/157 R, 157.3 R; 285/14, 41, 47, 55, 133 R; 228/182, 183

[56] References Cited

U.S. PATENT DOCUMENTS

| | | | |
|---|---|---|---|
| 1,140,633 | 5/1915 | Trucano | 285/47 |
| 2,695,182 | 11/1954 | Folz | 285/41 X |
| 2,860,311 | 11/1958 | Balian | 285/133 R X |
| 2,924,245 | 2/1960 | Wilson | 29/455 R UX |
| 3,551,006 | 12/1970 | James | 285/55 X |
| 3,650,550 | 3/1972 | West | 285/55 |
| 3,691,617 | 9/1972 | Burnett | 285/55 X |
| 3,993,330 | 11/1976 | Göransson | 285/14 |
| 4,127,287 | 11/1978 | Davis | 285/14 X |

Primary Examiner—Charlie T. Moon
Attorney, Agent, or Firm—R. B. Ingraham

[57] ABSTRACT

A full jacketed lined piping system with appropriate venting is provided wherein the jacket features welded construction to the flanges of the lined pipe.

3 Claims, 7 Drawing Figures

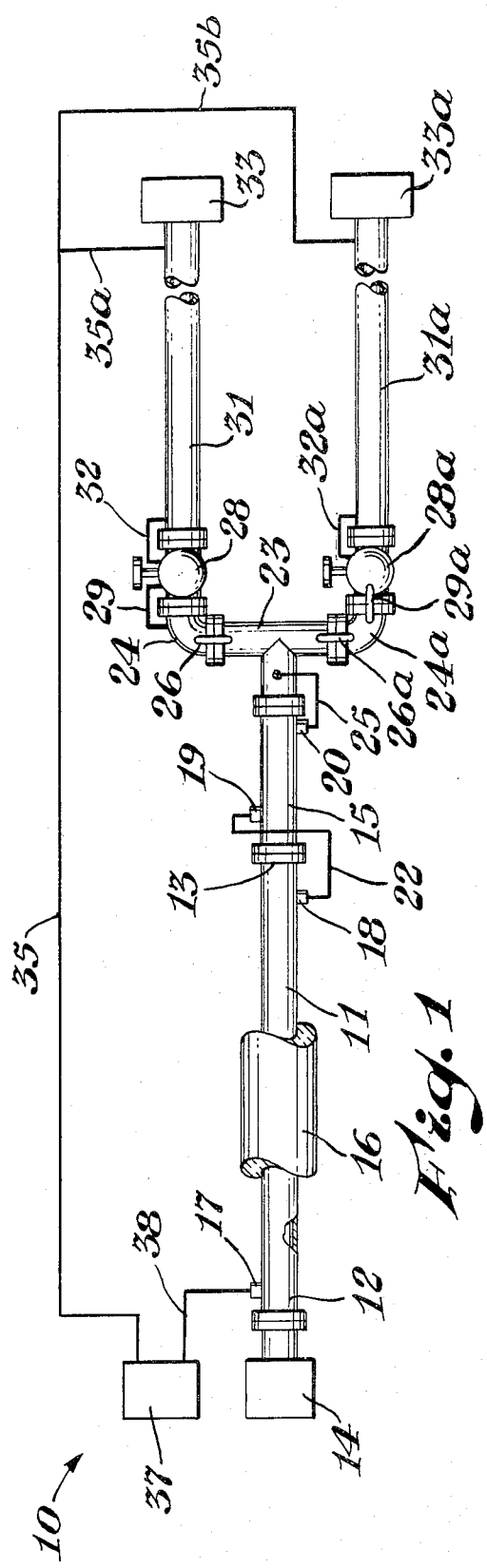
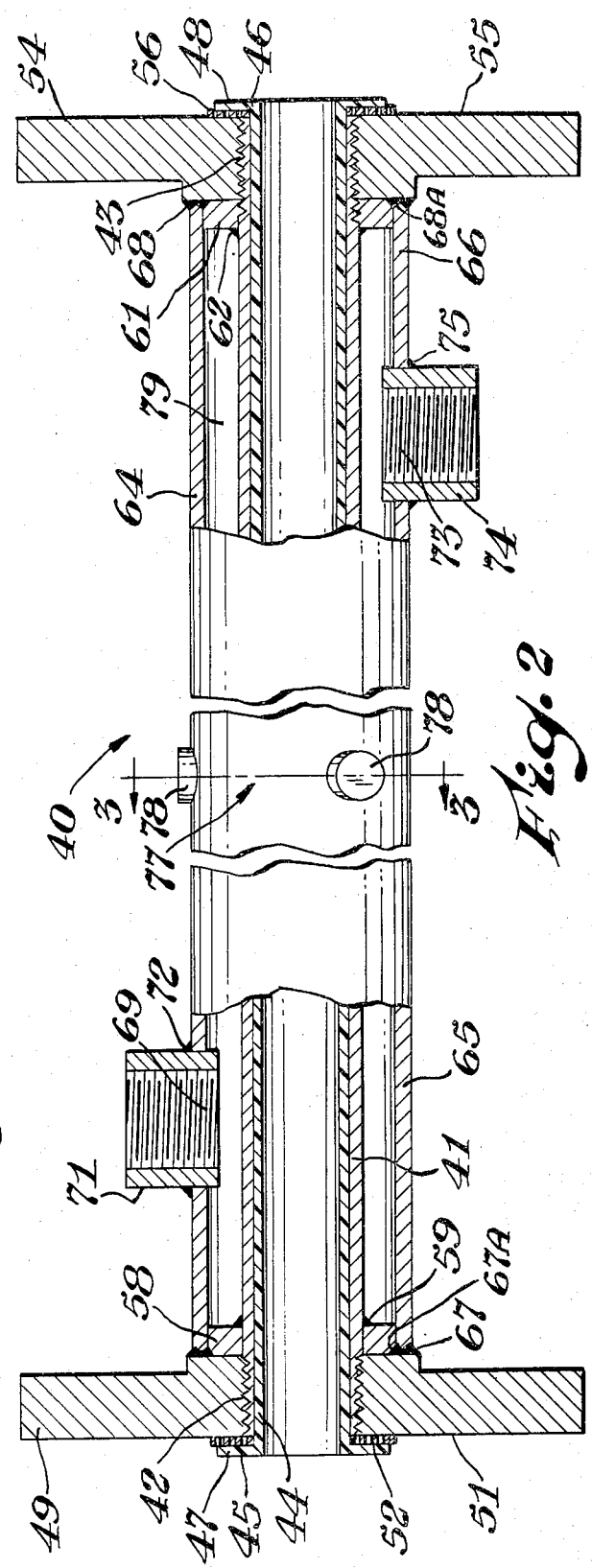

MAKING JACKETED LINED PIPE

CROSS-REFERENCE TO RELATED APPLICATION

This is a divisional, of application Ser. No. 31,795, filed Apr. 20, 1979.

Plastic lined pipe has found a wide application in the many industries wherein chemical resistance is required and oftentimes wherein it is desired that contamination of the flowing liquids by metal is to be avoided. Such plastic linings vary widely in composition and in thickness, depending primarily on the end use for which they are intended. In many instances it is desirable for such a piping system to convey liquids which at ambient temperatures are solids and in order to facilitate such transfer it is necessary to lag or provide a lined conduit with thermal insulation to prevent solidification of the liquid being conveyed. Oftentimes such pipe systems are traced, that is a second conduit containing a heat exchanging fluid is placed in close contact with the piping system conveying the solidifiable liquid. Occasionally such plastic lined pipe is jacketed, that is surrounded by a heat exchange jacket. Non plastic lined piping systems employ the so-called swaged jacket wherein a jacket is positioned about a major portion of the pipe between the flanges and the ends of the jacket are swaged to generally contact the outer surface of the lined pipe at a location generally adjacent the ends thereof and the jacket welded to the pipe. Such a system provides locations adjacent the ends of the pipe which generally are of the flange variety which do not benefit significantly from the heat exchange fluid flowing in the jacket about the pipe. Generally in order to prevent solidification or freezing of the liquid carried by the line of the pipe, it is necessary to provide significant quantities of thermal insulation about the pipe and fittings, and in the event that the piping system is required only intermittently, tracing is generally needed at joints between pipe sections and about fittings such as elbows, tees and the like.

It would be desirable if there were available an improved method for the preparation of a lined piping system.

It would also be desirable if there were available improved lined pipe fittings and method for the preparation thereof.

It would be desirable if there were available an improved lined piping system of the jacketed variety wherein tracing was not required.

These benefits and other advantages are achieved in a plastic lined piping system wherein the piping system comprises in cooperative combination a plurality of pipe elements and pipe fittings having at least one passageway for the conveyance of fluids extending therethrough and having at least a first end and a second end wherein the passage provides a full communication between the first end and the second end, the ends terminating in generally radially extending flanges adapted to meet with a like flange of an adjacent piping element and to provide a fluid tight seal therebetween, the improvement which comprises a jacket disposed about the piping element and in generally fixed spaced relationship thereto, the jacket being affixed to the flanges of the piping element, the jacket and the piping element defining a heat transfer fluid receiving space therebetween, the jacket having defined therein a heat exchange fluid inlet means and outlet means communicating with the fluid receiving space, the inlet means and the outlet means being generally remotely disposed from each other.

Also contemplated within the scope of the present invention are methods of fabricating pipe sections and fittings suitable for use in a pipe system of the present invention, plastic linings suitable for piping in accordance with the present invention including both thermoplastic and thermosetting linings well known in the art.

Such linings include phenol formaldehyde thermoset linings, epoxy resin linings, furfural alcohol linings, as well as the more popular thermoplastic linings which include polyethylene linings, polypropylene linings, polyvinyl chloride linings, vinylidene chloride polymer linings, fluorocarbon linings, such as polytrifluoroethylene linings, as well as linings of various thermoplastic copolymers such as vinylidene chloride, vinyl chloride copolymers and the like which are well known in the art.

Further features and advantages of the present invention will become more apparent from the following specification taken in connection with the drawing wherein FIG. 1 is a schematic cutaway view of a simplified piping system in accordance with the present invention.

FIG. 2 is a fractional partially cutaway view of a lined pipe in accordance with the present invention.

Figure 4:
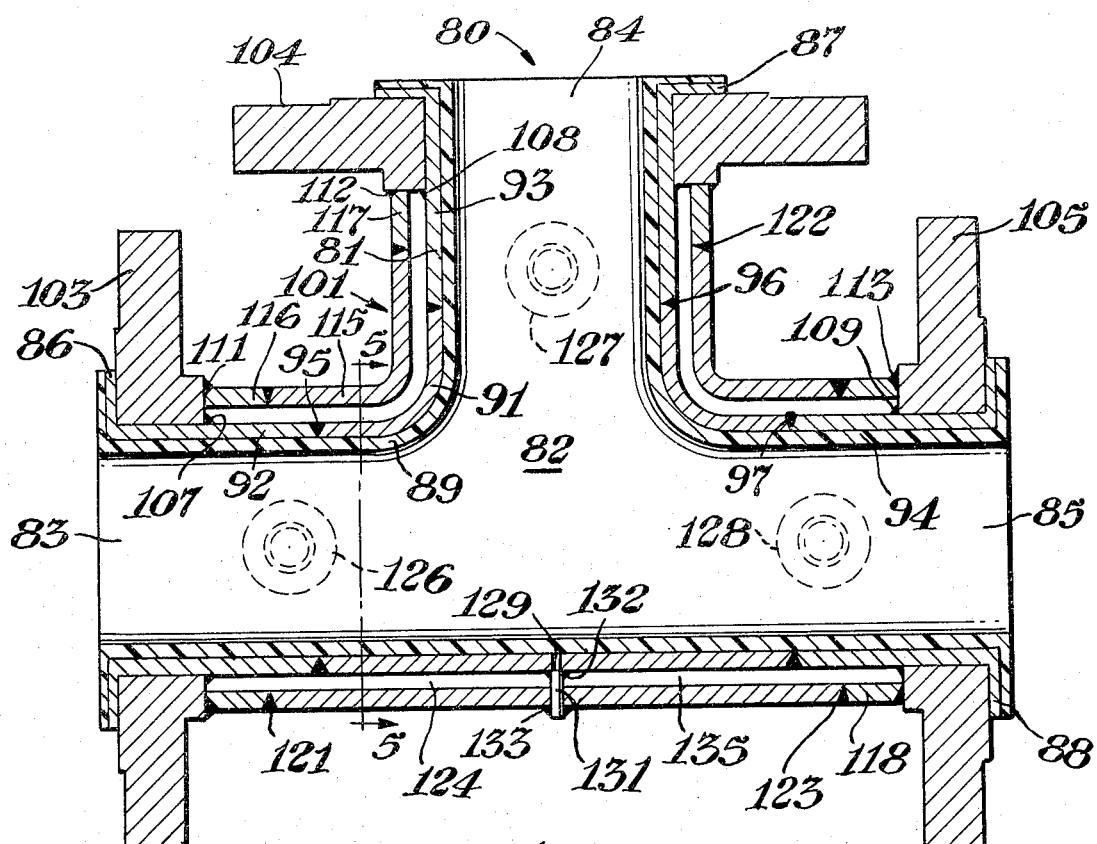
FIG. 4 is a sectional schematic representation of a tee in accordance with the present invention.

In FIG. 1 there is schematically depicted a partially cutaway view of a piping system in accordance with the present invention designated by the reference numeral 10.

The piping system comprises a first jacketed pipe section 11 having a first end 12 and a second end 13.

The first end 12 is in operative combination with the liquid source 14.

The second end 13 is in operative combination with a spool piece 15.

Lagging or insulation 16 covers the piping system 10. Lagging 16 is shown only in operative engagement with piping section 11.

Piping section 11 has a first heat exchange fluid port 17, and a second heat exchange fluid port 18.

The spool piece 15 is similarly provided with heat exchange fluid ports 19 and 20.

The ports 18 and 19 are interconnected by means of heat exchange fluid transfer conduit 22.

The spool piece 15, remote from second end 13 is connected to a jacketed tee 23.

The jacketed tee 23 is in turn connected to 90° elbows 24 and 24a.

The heat transfer fluid port 20 of the spool piece 15 is in turn connected to the tee 23 by means of conduit 25.

Conduits 26 and 26a provide connection between the heat exchange fluid ports of the elbows 24 and 24a and the jacket of the tee 23.

Remote from the tee 23, the elbows 24 and 24a are in operative combination with jacketed valves 28 and 28a.

The jackets of the valves 28 and 28a are in turn connected by conduits 29 and 29a respectively.

Remote from the elbows 24 and 24a, the valves 28 and 28a are connected to jacketed pipe sections 31 and 31a respectively.

The jackets of the pipe sections 31 and 31a are connected to jackets of the valves 28 and 28a respectively by means of conduits 32 and 32a.

The piping sections 31 and 31a remote from valves 28 and 28a are connected to receivers 33 and 33a.

The jackets of the piping sections 31 and 31a are connected to line 35 by means of the conduits 35a and 35b respectively.

The line 35 is connected to a heating and recirculating means 37 which in turn is connected to heat exchange fluid port 17 of piping section 11 by means of conduit 38.

In operation of the piping system 10 in accordance with the present invention, fluid is provided to the piping section 11 by means of the source 14.

The fluid passes through spool piece 15 into tee 23.

From tee 23 fluid selectively travels through the elbows 24 and 24a depending upon whether valves 28 and 28a are open or closed.

Fluid leaving the valves 28 and 28a passes through the pipe sections 31 and 31a and is discharged to receivers 33 and 33a.

The heating and recirculating means 37 provides desirable heat exchange fluid at a predetermined temperature to the line 35 which in turn flows through the conduits 35a and 35b into the jackets of the piping sections 31 and 31a.

The heat exchange fluid is discharged from the jacket of pipe sections 31 and 31a into the jackets of valves 28 and 28a respectively.

The heat exchange fluid is passed from the jackets of valves 28 and 28a into the jackets of the elbows 24 and 24a by means of conduits 29 and 29a respectively.

The heat exchange fluid flows from the jacket of the tee 23 through the conduit 25 into the jacket of the spool piece 15. From the jacket of the spool piece 15 through the conduit 22 into the jacket of piping section 11, the fluid is discharged from port 17 of piping section 11 through the conduit 38 into the heating and recirculating means 37.

The jackets of piping of the elements of the piping system 10 which employ a flange construction, extend from flange to flange in the pipe sections and fittings such as spool piece 15, elbows 24 and 24a, valves 28 and 28a and tee 23. Thus the fluid within the plastic lined piping system 10 is maintained at a desired temperature whether the fluid within the piping system is flowing or is stationary. Thus undesired solidification or cooling of the material within the system is avoided and minimum temperatures may be maintained in the heat exchange fluid flowing within the jackets of the various elements.

In FIG. 2 there is schematically depicted a partially cutaway and foreshortened view of a heat exchange conduit in accordance with the present invention generally designated by the reference numeral 40.

The conduit 40 comprises in cooperative combination a rigid metallic generally cylindrical inner conduit 41 having a first externally threaded end 42 and a second externally threaded end 43.

Disposed within the conduit 41 is a cylindrical plastic liner 44 which is generally coextensive with the conduit 41. The liner 44 has a first terminal end 45 and a second terminal end 46. The liner 44 defines a radially outwardly extending flange 47 at the first end 45 and a like radially outwardly extending flange 48 at the second end of the liner 44.

A flange 49 is disposed at first end 42 of the conduit 41 and threadably engages the external threads disposed on second end 42 of the conduit 41.

Flange 49 has a generally radially outwardly extending face 51 disposed generally adjacent to flange 47 of the liner 44. An annular foraminous non thermoplastic reinforcement 52 is disposed between face 51 of the flange 49 and the flange 47 of the plastic liner 44.

At the second end 43 of the conduit 41 is disposed a second flange 54 having a generally radially outwardly extending face 55 disposed generally adjacent to the flange 48 of the liner 44.

A rigid annular foraminous insert 56 is disposed between the flange 48 and the face 55 of the flange 54.

Beneficially, the inserts 52 and 56 are a perforate material; for example, steel having a thickness of about 0.05 inch and having $\frac{1}{8}$" perforations spaced on 3/16" centers.

An annular space means or spacing ring 58 is disposed about and external to the conduit 41 adjacent to the flange 49.

The flange 49 and spacing ring 58 are in generally abutting relationship. The spacing ring 58 is affixed to conduit 41 by means of a weld fillet 59.

A like spacing ring 61 is disposed about the conduit 41 at second end 43, the spacing ring 61 is in abutting relationship with the flange 54 remotely disposed from the face 55.

The spacing ring or means 61 is affixed to the conduit 41 by means of a weld fillet 62.

A jacket 64 is disposed about the conduit 41. The jacket 64 has a first end 65 adjacent the first end 42 of the conduit 41, and a second end 66 disposed adjacent a second end 43 of the conduit 41.

The jacket 64 is maintained in generally fixed space relationship from the conduit 41 by the spacing means 58 and 61.

The jacket 64 is affixed to the spacing means 58 and flange 49 by means of the weld fillet 67 at its first end 65.

A weld fillet or weldment 68 affixes the second end 66 of the jacket 64 to the spacing ring 61 into the flange 54 at a location remote from the face 55 of the flange 54.

Generally adjacent the first end 65 of the jacket 64 is disposed a first heat exchange fluid port 69. The fluid port 69 has affixed therein an internally threaded connector or coupling 71 affixed to the jacket 64 by means of a weld fillet 72.

A like heat exchange fluid port 73 is diametrically opposed to the port 69 of the jacket 64. The port 73 is disposed generally adjacent the second end 66 of the jacket 64. The port 73 has an internally threaded connector 74 disposed therein and maintained in fluid tight relationship with the jacket 64 by means of the weldment 75.

At a location between the flanges 49 and 54 is disposed a spacing means generally designated by the reference numeral 77. The spacing means 77 comprises a plurality of pins 78 passing through the jacket 64 and contacting the external surface of conduit 41, thus preventing under load any significant displacement of the conduit 41 relative to the jacket 64.

As depicted in FIG. 2 the conduit 41, liner 44 and jacket 64 are disposed in generally coaxial relationship.

Figure 3:
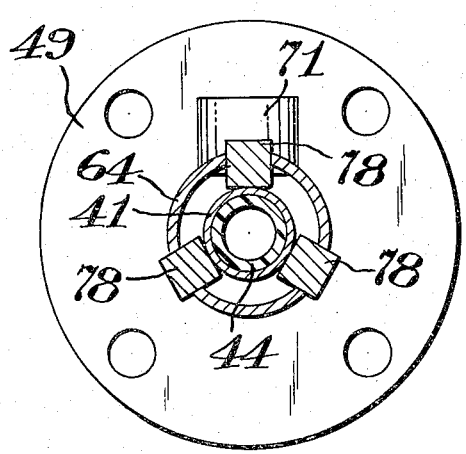
FIG. 3 is a sectional view of the lined pipe of FIG. 2 taken along the line 3—3 thereof.

FIG. 3 depicts a sectional view of the conduit 40 of FIG. 2 taken along the line 3—3 thereof and depicting the arrangement of the pins or spacing means 78 of FIG. 2.

As depicted in FIG. 3, the pins 78 are three in number and are disposed relative to the axis of conduit 41 radially at about 120° spacing.

In fabrication of a conduit in accordance with the present invention such as is depicted in FIGS. 2 and 3, the conduit such as conduit 41 is cut to the desired length. At this point the conduit 41 is lined by inserting the liner 44. The liner 44 beneficially is of greater length than the conduit 41. The liner 44 has been positioned, externally threaded, and the spacers 58 and 61 positioned over the conduit 41. The spacer 58 positioned and welded to the conduit 41. The spacer 61 is welded to conduit 41. The jacket 64, preferably having the ports 69 and 73 and spacer pin openings corresponding to the spacer 78 formed therein is positioned and welded to spacers 58 and 61 by welds 67A and 68A. The threaded connectors 71 and 74 are applied with their corresponding welds 72 and 75 respectively being made. The spacing pins 78 are positioned and welded.

At this point desirably the space 79 defined between the jacket 64 and conduit 41 and spacing members 58 and 61 are pressure tested to determine if all welds have been properly made and no leakage exists. Flanges 49 and 54 are screwed on with bolt. Holes of flanges 49 and 54 in alignment with one another and welded into position with welds 67 and 68. In the event the liner is of thermoplastic material, the reinforcement 52 and 56 are positioned and the liner flanged to provide the flanges 47 and 48 respectively. While the foregoing description is exemplary of the manner in which such a conduit may be prepared, obvious minor variations may be employed in the construction sequence.

In FIG. 4 there is depicted a sectional view of a tee in accordance with the present invention designated by the reference numeral 80. The tee 80 comprises a first or inner metallic member 81 defining an internal passageway 82. The passageway 82 is in full communication with openings 83, 84 and 85. The inner member 81 generally adjacent the openings 83, 84 and 85 is of generally circular cross section and terminates in the region of the openings 83, 84 and 85 with radially outwardly extending flanges 86, 87 and 88 respectively.

A synthetic resinous liner 89 conforms to the inner surface of member 81 and to the adjacent surfaces of flanges 86, 87 and 88.

As depicted in FIG. 4, member 81 comprises a welding tee 91 having affixed thereto flange stub ends 92, 93 and 94 by means of welds 95, 96 and 97 respectively. A jacket member 101 is disposed in generally fixed spaced relationship to the inner member 81. Flanges 103, 104 and 105 are disposed adjacent the flanges 86, 87 and 88 respectively, flanges 103, 104 and 105 having generally radially outwardly extending faces disposed immediately adjacent the flanges 86, 87 and 88 respectively. The flanges 103, 104 and 105 are affixed to the inner member 81 by means of welds 107, 108 and 109 respectively. The external or jacket member 101 is affixed to flange 103 by means of weld 111 to flange 104 by means of weld 112 and flange 105 by means of weld 113.

The outer member 101 beneficially comprises a welding tee 115 affixed thereto rings or pipe portions 116, 117 and 118 by means of welds 121, 122 and 123 respectively. The members 101, 81 and flanges 103, 104 and 105 define a heat exchange fluid space 124.

As depicted in FIG. 4, three threaded connectors 126, 127 and 128 provide communication between the space 124 and space external to the tee 80. Connectors 126, 127 and 128 provide a means of recirculating heat exchange fluid within the space 124. The member 81 defines a generally radially disposed vent 129. A vent tube 131 is affixed over the vent 129 in liquid tight sealing engagement with the inner member 81, with weld 132 and with the jacket 101 by means of weld 133. The vent tube 131 provides a path for the escape of any gases which may either form between the lining member 89 and the inner member 81 or gases which may permeate through the liner 89.

Figure 5:
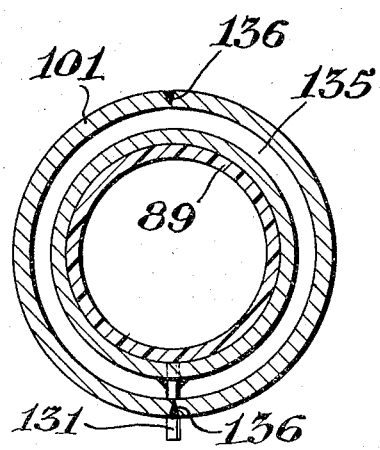
FIG. 5 is a sectional view of the tee of FIG. 4 taken along the line 5—5 thereof.

FIG. 5 is a sectional view of the tee 80 of FIG. 4 taken along the line 5—5 thereof. In fabrication of a tee such as the tee 80 of FIG. 4, the inner member 81 optionally may be formed in one piece; or advantageously formed as depicted in FIG. 4 from a standard welding tee such as indicated by the reference numeral 91 by the addition of the flanged stub ends 92, 93 and 94 respectively which are attached by the circumferential welds 95, 96 and 97 respectively. Beneficially, such welds are most conveniently accomplished employing a jig and an automated welding device such as tungsten, inert gas or submerged arc and the like.

The stub ends 92, 93 and 94 are attached to the flanges 103, 104 and 105 by welds 107, 108 and 109. The ring portions 116, 117 and 118 are slipped over the appropriate arms of the stub ends 92, 93 and 94 and welded to flanges 103, 104 and 105 by welds 111, 112 and 113. The stub ends 92, 93 and 94 are welded to tee 91 by welds 95, 96 and 97 respectively.

Advantageously the vent tube 131 is affixed to the inner member 81 by means of the weld 132 and employing the vent tube 131 as a drill guide, the passageway or vent 129 is formed by drilling through the wall of the inner member 81. A standard welding tee such as 115 is then split in two along a plane which contains the axes of all three openings. The two edges of the tee corresponding to 115 of FIG. 4 are placed about the central portion of member 81 after relief has been provided for the vent tube 131 and the two edges sealed by means of welds 121, 122 and 123 to rings 116, 117 and 118 respectively. The two edges are then sealed together to provide a liquid tight assembly defining a heat transfer fluid space 135 therebetween. Appropriate openings if not previously formed are provided, and threaded connectors such as the connectors 126, 127 and 128 are provided and welded thereon to provide a convenient means of supplying heat transfer fluid to the space 135.

The configuration of the tee such as is shown in FIG. 4 is particularly desirable in that it permits construction of the jacketed tee which has face to face dimensions either equal to or closely approximating that of a standard unjacketed tee. When welding is complete, the fitting is plastic lined by techniques well known to the art.

For the sake of clarity the welds joining the two edges of tee 115 have been omitted from FIG. 4 but are depicted in FIG. 5 and designated by the reference numeral 136.

Figure 6:
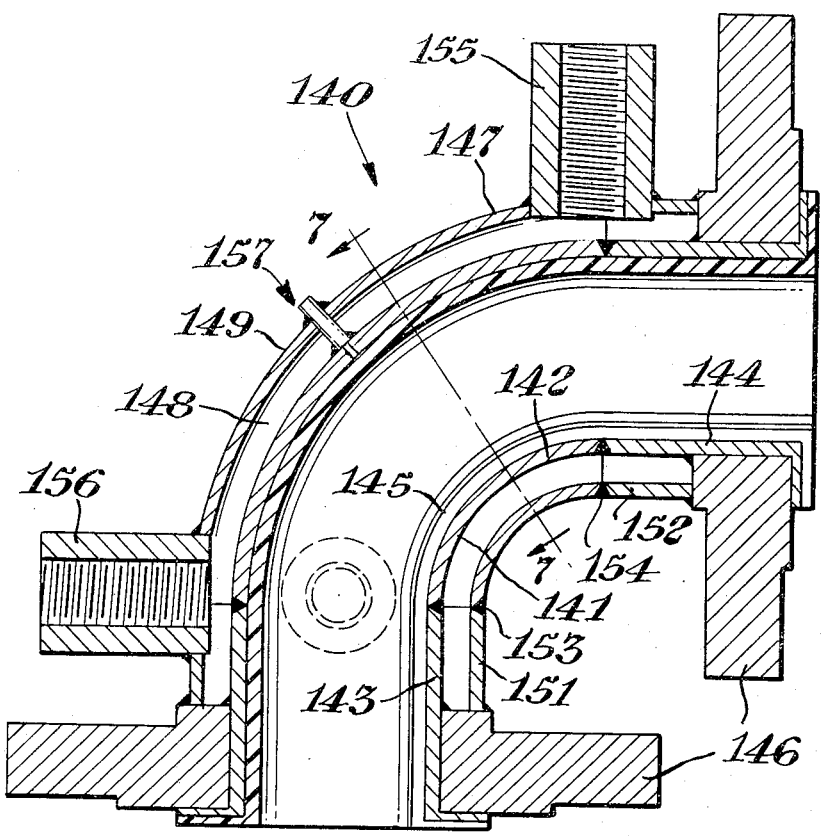
FIG. 6 is a sectional view of an elbow in accordance with the present invention.

In FIG. 6 there is depicted a sectional view of a plastic lined elbow in accordance with the present invention generally designated by the reference numeral 140. The elbow 140 comprises a first or inner member 141 having the configuration of a circular conduit having a 90° bend therein and a radially outwardly extending flange on either end. The inner member 141 comprises a short radius welding 90° elbow 142 having a flange stub end 143 affixed to one end thereof and a similar flange stub end 144 affixed to the opposite end thereof.

A plastic liner 145 is disposed on the inner surface of inner member 141 and the adjacent surface of the flanged terminal portions.

The elbow 140 has a pair of like terminal flanges 146 disposed adjacent the terminal portions of conduit member 141 and remotely disposed from the plastic lining on the face of the flanged terminal portions.

An outer conduit member 147 is disposed about the inner member 141 and extends between the flanges 146 and is in fixed space relationship to the inner member 141; the flanges and the member 141 and 147 define a generally annular space 148 having an annular cross sectional configuration therebetween. The outer member 147 comprises a long radius elbow 149 having affixed thereto two short sections of pipe 151 and 152 respectively.

Pipe sections 151 and 152 are affixed to either end of the elbow by means of welds 153 and 154 respectively. A first heat exchange fluid connector 155 is affixed to outer member 147 and provides communication between the space 148 and space external to the elbow.

A similar connector 156 is remotely disposed from the connector 155. A means defining a vent passage 157 provides communication between the inner face of inner member 141 and the liner 145 and space external to the elbow.

Figure 7:
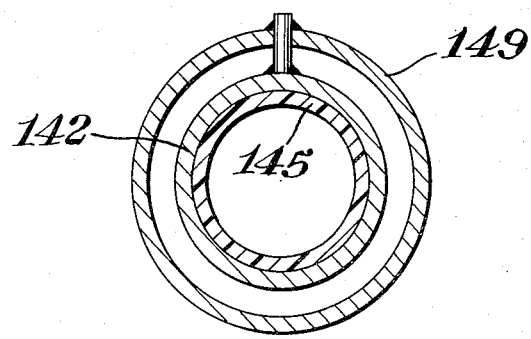
FIG. 7 is a sectional representation of the elbow of FIG. 6 taken along the line 7—7 thereof.

FIG. 7 is a section of the elbow 140 taken along the line 7—7 of FIG. 6 showing the relationship between the liner 145, the inner elbow 142 and the jacket elbow 149.

A desirable method of constructing an elbow in accordance with the present invention is to provide a short radius welding elbow such as elbow 142. Position flanges 146 and rings 151 and 152 on stub ends 143 and 144. Weld flanges to stub ends. Weld stub end assemblies to short radius elbow 142. Weld rings 151 and 152 to flanges 146. Install vent assembly 157 to 142 by welding. Split long radius elbow 149 and place around 142 assembly in position indicated, making the appropriate circumferential and axial weld including the weld about the vent assembly 157.

Openings for the connectors 155 and 156 are then formed in outer member 147 and the connectors 155 and 156 welded in position. The fitting is then subsequently plastic lined and the terminal portions of the plastic liner and the inner member 141 are flanged radially outwardly to conform generally to the faces of flanges 146.

The lining of plastic pipe and fittings therefore is well known to those skilled in the art. Various techniques developed which are exemplary to flanging of plastic lined pipe are found in U.S. Pat. Nos.: 3,148,896; 3,335,484; 3,383,750; 3,390,442; 3,448,491; 3,461,505.

Perforate reinforcements for plastic flanges are set forth in U.S. Pat No. 3,650,550.

The simultaneous flanging of both liner and pipe is described in U.S. Pat. No. 3,742,590 and 3,744,115.

Isotatic molding techniques suitable for the preparation of pipe and pipe fittings are set forth in the following U.S. Pat. Nos.: 2,929,109; 3,537,700; 3,459,213; 3,438,388; 3,026,530.

The teachings of the foregoing patents are herewith incorporated by reference thereto.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the preparation of a lined pipe, the steps of the method comprising providing a first metallic conduit having a first end and a second end, disposing on the first end and the second end of the conduit a metallic spacing ring, welding the spacing ring in liquid tight engagement to the conduit, providing a first flange, disposing the first flange on the first end of the conduit, providing a generally cylindrical jacket, positioning the jacket over the spacing rings in abutting relationship to the first flange; providing a second flange on the second end of the pipe, welding in liquid tight engagement the jacket to the first and second flanges and metallic spacing rings, subsequently lining the pipe with a plastic liner.

2. The method of claim 1 including the step of providing a centering means to maintain the jacket and first conduit in generally concentric relationship.

3. The method of claim 1 including the step of disposing a perforated metal annular insert adjacent terminal faces of first and second flanges and forming a flange on the plastic liner which overlays perforated metal annulus.

* * * * *